(12) United States Patent
Tiku et al.

(10) Patent No.: US 12,260,313 B2
(45) Date of Patent: Mar. 25, 2025

(54) ARTIFICIAL NEURAL NETWORK BYPASS

(71) Applicant: Micron Technology, Inc., Boise, ID (US)

(72) Inventors: Saideep Tiku, Fort Collins, CO (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 1079 days.

(21) Appl. No.: 16/951,768

(22) Filed: Nov. 18, 2020

(65) Prior Publication Data

US 2022/0156559 A1 May 19, 2022

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC .......... G06N 3/045; G06N 3/08; G06N 3/047; G06N 3/063
See application file for complete search history.

(56) References Cited

U.S. PATENT DOCUMENTS

| | | |
|---|---|---|
| 10,510,000 B1 | 12/2019 | Commons |
| 2018/0121788 A1 | 5/2018 | Hashimoto et al. |
| 2018/0293076 A1* | 10/2018 | Sadasivam ............. G06N 3/063 |
| 2019/0034558 A1* | 1/2019 | Leeman-Munk ... G06F 3/04842 |
| 2019/0179795 A1 | 6/2019 | Huang et al. |
| 2019/0266236 A1* | 8/2019 | Battach .................. G06N 3/045 |
| 2019/0362269 A1* | 11/2019 | Barad ...................... G06F 21/55 |
| 2020/0059740 A1 | 2/2020 | Xu et al. |
| 2020/0184335 A1 | 6/2020 | Rom et al. |
| 2020/0380369 A1* | 12/2020 | Case ........................ G06N 3/086 |
| 2021/0012194 A1* | 1/2021 | Laskaridis ............. G06N 3/063 |
| 2021/0390144 A1* | 12/2021 | B M S .............. G06F 16/90332 |
| 2021/0406683 A1* | 12/2021 | Kai ........................ G06F 18/211 |
| 2022/0188569 A1* | 6/2022 | Ananthanarayanan ...................... G06V 20/58 |

FOREIGN PATENT DOCUMENTS

| | | |
|---|---|---|
| CN | 107918794 | 4/2018 |
| EP | 3686806 | 7/2020 |

OTHER PUBLICATIONS

Teerapittayanon, Surat, Bradley McDanel, and Hsiang-Tsung Kung. "Branchynet: Fast inference via early exiting from deep neural networks." In 2016 23rd international conference on pattern recognition (ICPR), pp. 2464-2469. IEEE, 2016. (Year: 2016).*
Fang, Biyi, Xiao Zeng, Faen Zhang, Hui Xu, and Mi Zhang. "Flexdnn: Input-adaptive on-device deep learning for efficient mobile vision." In 2020 IEEE/ACM Symposium on Edge Computing (SEC), pp. 84-95. IEEE, 2020. (Year: 2020).*

(Continued)

*Primary Examiner* — Michael W Ayers
*Assistant Examiner* — Nicholas S Wu
(74) *Attorney, Agent, or Firm* — Brooks, Cameron & Huebsch, PLLC

(57) ABSTRACT

Apparatuses and methods can be related to implementing bypass paths in an ANN. The bypass path can be used to bypass a portion of the ANN such that the ANN generates an output with a particular level of confidence while utilizing less resources than if the portion of the ANN had not been bypassed.

19 Claims, 9 Drawing Sheets

(56) References Cited

OTHER PUBLICATIONS

Kaya, Yigitcan, Sanghyun Hong, and Tudor Dumitras. "Shallow-deep networks: Understanding and mitigating network overthinking." International conference on machine learning. PMLR, 2019. (Year: 2019).*

Kim, Geonho, and Jongsun Park. "Low cost early exit decision unit design for cnn accelerator." 2020 International SoC Design Conference (ISOCC). IEEE, 2020. (Year: 2020).*

Moon, Jooyoung, et al. "Confidence-aware learning for deep neural networks." Proceedings of the 37th International Conference on Machine Learning. 2020. (Year: 2020).*

Bolukbasi, Tolga, et al. "Adaptive neural networks for efficient inference." International Conference on Machine Learning. PMLR, 2017. (Year: 2017).*

Wang, Xin, et al. "Skipnet: Learning dynamic routing in convolutional networks." Proceedings of the European conference on computer vision (ECCV). 2018. (Year: 2018).*

Laskaridis, Stefanos, et al. "SPINN: synergistic progressive inference of neural networks over device and cloud." Proceedings of the 26th annual international conference on mobile computing and networking. 2020. (Year: 2020).*

Scardapane, Simone, et al. "Why should we add early exits to neural networks ?. " Cognitive Computation 12.5 (2020): 954-966. (Year: 2020).*

International Search Report and Written Opinion from related PCT Application No. PCT/US2021/055343, dated Jan. 27, 2022, 10 pages.

Jooyoung Moon et al., 'Confidence-Aware Learning for Deep Neural Networks', arXiv:2007.01458v3, Aug. 13, 2020 [retrieved on Jan. 12, 2022]. Retrieved from: <URL: https://arxiv.org/pdf/2007.01458.pdf>, pp. 1-14.

\* cited by examiner

ARTIFICIAL NEURAL NETWORK BYPASS

TECHNICAL FIELD

The present disclosure relates generally to memory, and more particularly to apparatuses and methods associated with implementing an artificial neural network bypass.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
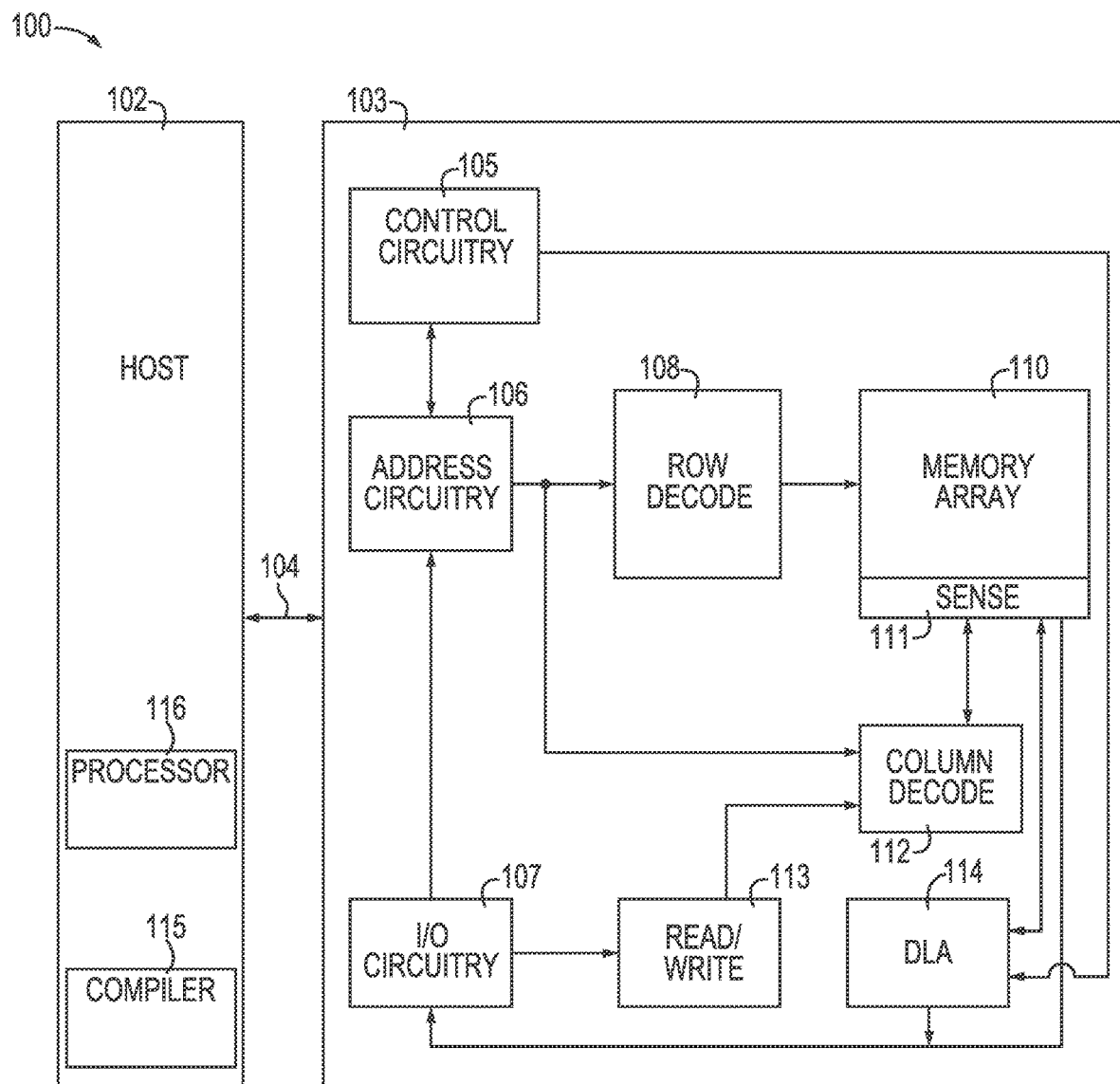
FIG. 1 is a block diagram of an apparatus in the form of a computing system including a memory device in accordance with a number of embodiments of the present disclosure.

The present disclosure includes apparatuses and methods related to compiling instructions for implementing an artificial neural network (ANN) bypass. One or more bypass paths can be implemented in an ANN to bypass layers of the ANN.

As used herein, the ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. A plurality of nodes of the ANN can be grouped to form layers of the ANN.

Inexpensive and energy-efficient artificial intelligence (AI) accelerators such as deep learning accelerators (DLAs) can be implemented on the edge of a memory device and are referred to herein as "edge DLAs." As used herein, an edge of a memory device can refer to an area of the memory device other than an area of the memory device occupied by the memory array and/or the sensing circuitry. For example, an edge of the memory device can refer to an output and/or input path of a memory device, where the output path and/or the input path is used to store and/or read data from a memory array of the memory device.

As used herein, AI refers to the ability to improve an apparatus through "learning" such as by storing patterns and/or examples which can be utilized to take actions at a later time. Deep learning refers to a device's ability to learn from data provided as examples. Deep learning can be a subset of AI. Neural networks, among other types of networks, can be classified as deep learning. The low power, inexpensive design of DLAs can be implemented in internet-of-things (IOT) devices, among other types of devices. The edge DLAs can process and make intelligent decisions at run-time. Memory devices including the edge DLAs can also be deployed in remote locations without cloud or offloading capability. Improving the efficiency at which ANNs are executed in a DLA can improve a function of a memory device hosting the DLA. For example, improving the latency, power consumption, and/or throughput of the DLA can cause an improvement to the latency, power consumption, and/or throughput of a memory device hosting the DLA.

Aspects of the present disclosure can improve an efficiency of the ANN executed by a DLA by implementing bypass paths in the ANN. The bypass paths can be implemented between layers of the ANN. The bypass paths can be used to execute layers of the ANN and not different layers of the ANN. The layers of the ANN executed via the bypass paths can be used to bypass the different layers of the ANN. Bypassing layers of the ANN can cause the ANN to be executed more efficiently than not bypassing layers of the ANN, which can improve a function of the DLA and the memory device hosting the DLA.

The figures herein follow a numbering convention in which the first digit or digits correspond to the drawing figure number and the remaining digits identify an element or component in the drawing. Similar elements or components between different figures may be identified by the use of similar digits. For example, 220-1 may reference element "20" in FIG. 2, and a similar element may be referenced as 420-1 in FIG. 4. Analogous elements within a Figure may be referenced with a hyphen and extra numeral or letter. See, for example, elements 222-1, . . . , 222-6 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus."

In this example, the computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. The host 102 can include a number of processing resources (e.g., one or more processors, microprocessors, or some other type of controlling circuitry), referred to as processors 116, capable of accessing the memory device 103. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or 3D Cross-point array for instance. The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 103.

The memory device 103 includes address circuitry 106 to latch address signals provided over an interface 104. The interface can include, for example, a physical interface (e.g., a data bus, an address bus, and a command bus, or a combined data/address/command bus) employing a suitable protocol. Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

The memory device (e.g., memory sub-system) can also comprise a DLA 114. The DLA can be implemented on an edge of the memory device. For example, the DLA 114 can be implemented external to the memory array 110. The DLA 114 can be coupled to an output path that couples the memory array 110 to the I/O circuitry 107.

The DLA 114 can also be coupled to the control circuitry 105. The control circuitry 105 can control the DLA 114. For example, the control circuitry 105 can provide signaling to the row decoder 108 and the column decoder 112 to cause the transferring of data from the memory array 110 to the DLA 114 to provide an input to the DLA 114 and/or an ANN which is hosted by the DLA 114. The control circuitry 105 can also cause the output of the DLA 114 and/or the ANN to be provided to the I/O circuitry 107 and/or be stored back to the memory array 110.

Figure 2:
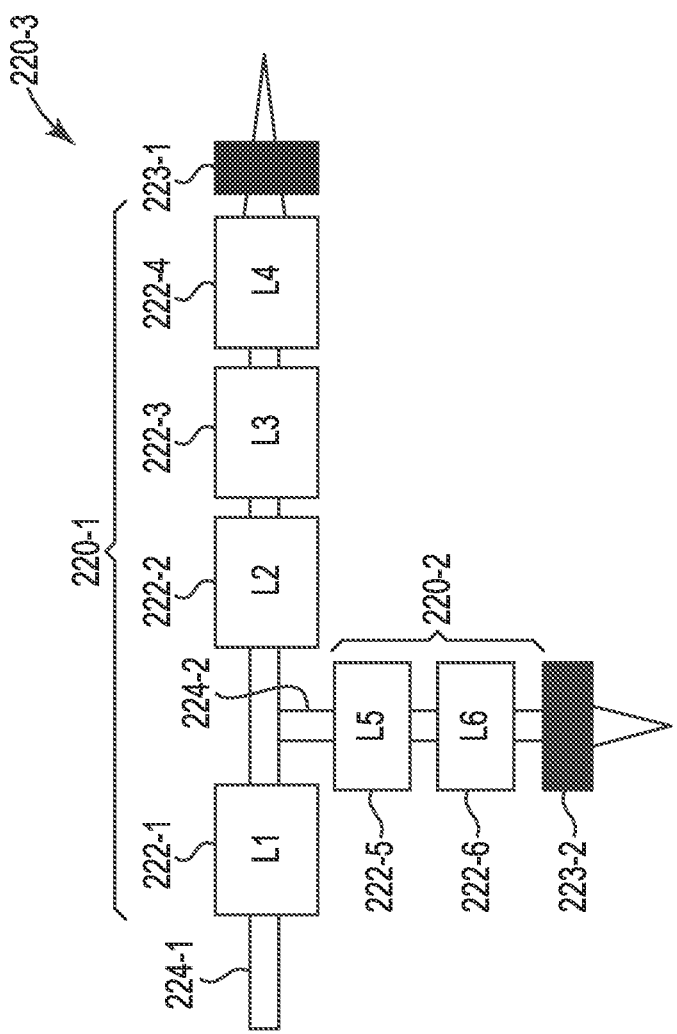
FIG. 2 illustrates an artificial neural network with a bypass path in accordance with a number of embodiments of the present disclosure.

The DLA 114 can host an ANN such as an ANN 220 in FIG. 2. The DLA 114 can be controlled by the control circuitry 105 to execute the ANN. An efficiency of the execution of the ANN can be improved by incorporating bypass paths to the ANN. The bypass paths can cause particular layers of the ANN not to be executed and different layers of the ANN to be executed instead. Executing the different layers of the ANN utilizing the bypass paths can cause the ANN to be executed in less time than the execution of the ANN utilizing the particular layers of the ANN. Execution of the different layers can utilize less resources of the memory device 103 than execution of the particular layers.

In various examples, the compiler 115 hosted by the host 102 can be used to determine a placement of the bypass paths in the ANN executed by the DLA 114. As used herein, the compiler 115 can include hardware, software, and/or firmware. For example, the compiler 115 can include hardware separate from a processor 116. In various examples, the compiler 115 can comprise computer-executable instructions which can be executed by the processor 116 to compile the instructions.

The complied instructions generated by the compiler 115 can be provided to the control circuitry 105 to cause the control circuitry 105 to store the compiled instructions and/or execute the compiled instructions. Once the compiled instructions are stored in the memory array 110, the host 102 can provide commands to the memory device 103 to execute the compiled instructions utilizing the DLA 114. The compiled instructions can be executed by the DLA 114 to execute an ANN. The control circuitry 105 can cause the compiled instructions that are stored in the memory array 110 to be provided to the DLA 114. The control circuitry 105 can cause the DLA 114 to execute the compiled instructions. The control circuitry 105 can cause the output of the DLA 114 to be stored back to the memory array 110, to be returned to the host 102, and/or to be used to perform additional computations in the memory device 103.

FIG. 2 illustrates an ANN 220-3 with a bypass path 224-2 in accordance with a number of embodiments of the present disclosure. The ANN 220-3 can be executed by the DLA 114 of FIG. 1. The execution of the ANN 220-3 in the DLA can be controlled by the control circuitry 105.

The ANN 220-3 includes layers 222-1, 222-2, 222-3, 222-4, 222-5, 222-6, referred to as layers 222. An ANN can contain a plurality of output layers with or without the use of bypass paths. For example, the ANN 220-3 also includes output layers 223-1, 223-2. The layers 222 can include a plurality of nodes that are configured to propagate signals utilizing weights and biases. Each of the nodes of each of the layers 222 can propagate signals received from nodes in a different layer responsive utilizing the weights, the biases, and an activation function. As used herein, an activation function defines the output of a node given a plurality of inputs. The inputs to a node can be processed utilizing a plurality of weights and a bias. The result of the processing of the inputs can be utilized by the activation function. If the processed inputs meet a threshold, then an output of the activation function can be propagated to a plurality of nodes of a subsequent layer of the ANN 220-3.

The output layers 223-1, 223-2 can provide an output of the ANN 220-3. The output layer 223-1 can receive signals from the layer 222-4 and can generate an output to the ANN 220. The output layer 223-2 can receive signals from the layer 222-6 and can also generate an output for the ANN 220-3.

The ANN 220-3 can comprise a plurality of paths 224-1 and 224-2. A path, as described herein, can describe an execution stream. The path 224-1 of the ANN 220-3 includes the layers 222-1, 222-2, 222-3, 222-4. The path 224-2 of the ANN 220-3 includes the layers 222-5, 222-6. The path 224-2 can diverge from the path 224-1. For example, the path 224-2 can diverge from the path 224-1 between layer 222-1 and layer 222-2 among other layers.

In various examples, the path 224-1 can correspond to a first ANN 220-1 and the path 224-2 can correspond to a second ANN 220-2. The first ANN 220-1 and the second ANN 220-2 can be combined to generate the ANN 220-3.

The path 224-2 can be referred to as a bypass path 224-2. The path 224-2 can bypass a portion of the path 224-1. A portion of the path 224-1 can refer to a number of layers of the ANN 220-1. For example, the path 224-2 can bypass the layers 222-2, 222-3, 222-4 of the path 224-1.

For instance, the path 224-2 can generate an output prior to the path 224-1 generating an output. If the output generated by the path 224-2 is suitable, then the control circuitry can refrain from executing the path 224-1 in the DLA. The suitable output of the output layer 223-2 can be an output of the ANN 220-3. As used herein, suitability of an output is further described in FIG. 4.

Refraining from executing the path 224-1 can include halting the execution of the path 224-1. Halting the execution of the path 224-1 can include refraining from executing at least one of the layers 222-2, 222-3, 222-4. If the output generated by path 224-2 is not suitable, then the path 224-1 can continue to be executed such that an output is generated by the output layer 223-1 which can be the output of the ANN 220-3.

In various instances, the paths 224-1, 224-2 can be executed concurrently or a portion of the path 224-1 can be executed sequentially with the execution of the path 224-2. As used herein, executing a path can include executing the layers of the path. The layers 222-2, 222-3, 222-4 can be executed after the execution of the layers 222-5, 222-6 if the output generated by the output layer 223-2 is not suitable.

Figure 3:
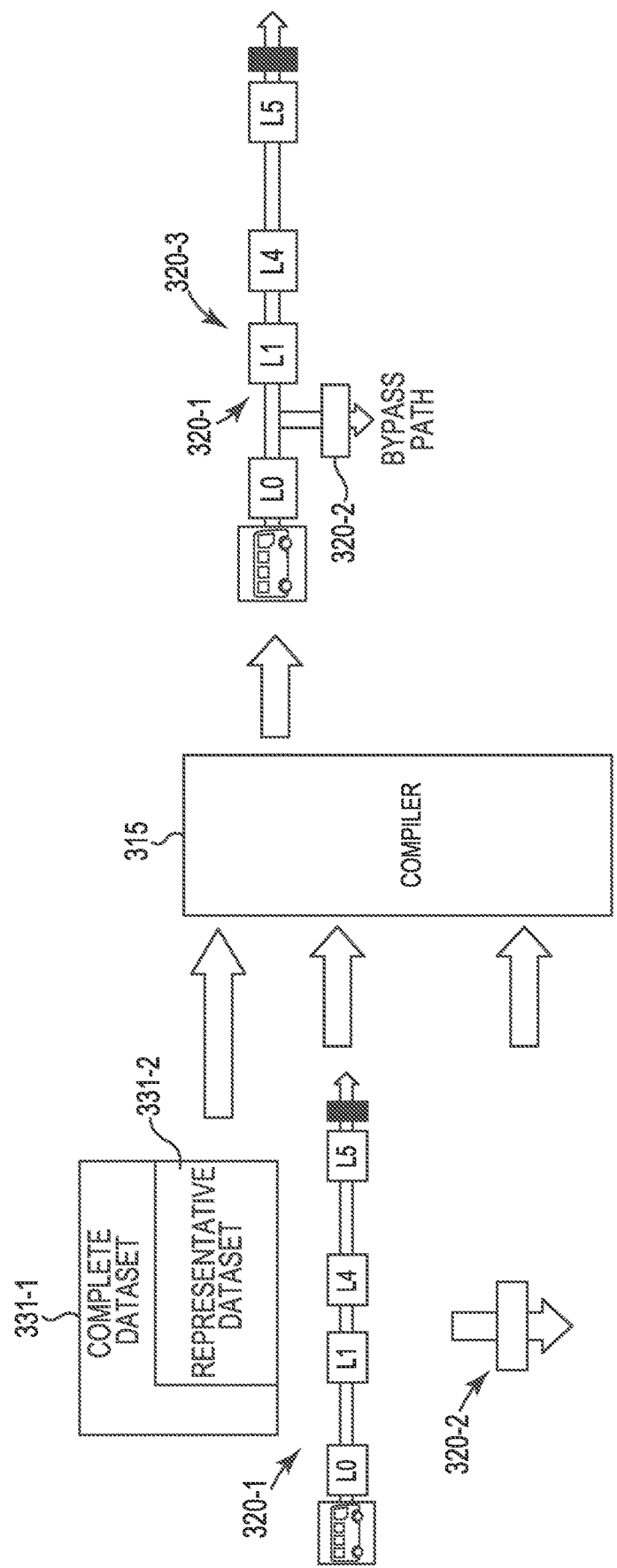
FIG. 3 illustrates a compiler in accordance with a number of embodiments of the present disclosure.

FIG. 3 illustrates a compiler 315 in accordance with a number of embodiments of the present disclosure. The compiler 315 can be incorporated in a host such as host 102 of FIG. 1.

In various examples, the compiler 315 can receive an ANN 320-1, an ANN 320-2, and a representative dataset 331-2 which is also referred to as a dataset 331-2. The compiler 315 can receive the ANN 320-1 and the ANN 320-2 by receiving data that represents the ANN 320-1 and the ANN 320-2. The ANN 320-1, the ANN 320-2, and/or the representative database 331-2 can be retrieved from a memory array and/or can be received from a host.

The representative data set 331-2 can be a subset of the complete dataset 331-1. The complete data set 331-1 can include the representative data set 331-2 and a different data set. The different data set can be the portion of the complete data set 331-1 other than the representative data set 331-2. The different data set can be used to train an ANN 320-3. The dataset 331-2 can be used by the compiler to determine how the ANN 320-1 and the ANN 320-2 are combined to generate the ANN 320-3.

For example, the compiler 315 can be configured to optimize the ANN 320-3 to meet a resource criterion such as a throughput, energy consumption, and/or latency. The structure of the ANN 320-2 and the placement of the ANN 320-2 within the ANN 320-1 can be determined by the compiler 315 based on a target energy or memory constraints for the ANN 320-3. The structure of the ANN 320-2 and the placement of the ANN 320-2 within the ANN 320-1 can also be determined by the compiler 315 using the representative dataset 331-2. The structure of the ANN 320-2 can include hyperparameters such as the quantity of nodes that comprise the ANN 320-2 and the quantity of layers of the ANN 320-2. As used herein, placing the ANN 320-2 in the ANN 320-1 can include integrating the layers of the ANN 320-2 and the ANN 320-1 using a bypath pass to generate the ANN 320-3. The ANN 320-2 can be placed in the ANN 320-1 by executing instructions that comprise the compiler 315 and/or that are utilized by the compiler 315. For instance, the compiler 315 can determine a placement of a bypass path within the plurality of layers of the ANN 320-1. The bypass path can be used to execute the layers of the ANN 320-2 such that the bypass path, if an output signal of the ANN 320-2 is selected, bypasses a portion of the plurality of layers of the ANN 320-1. The compiler 315 can determine whether to place the ANN 320-2 between an L0 layer, an L1 layer, an L4 layer, and/or an L5 layer, among other possible layers. FIG. 3 shows the layers of the ANN 320-2 as being integrated with the layers of the ANN 320-2 between the L0 layer and the L1 layer using a bypass path.

The execution of the portion of the layers of the ANN 320-1 can utilize more resources of the memory device than an execution of the layers of the ANN 320-2. Bypassing a portion of the layers (e.g., L1 layer, L4 layer, and L5 layer) of the ANN 320-1 utilizing the ANN 320-2 can cause the execution of the ANN 320-3 to utilize less resources than if the portion layers of the ANN 320-1 had been executed.

In various instances, an execution of the ANN 320-2 can utilize less resources of the memory device than a resource threshold defining a resource criterion of the memory device. The resource threshold comprises an energy consumption of the memory device, a latency of the execution of the ANNs 320-1, 320-2, and/or a bandwidth of the memory device during execution of the ANNs 320-1, 320-2.

The compiler 315 can compile instructions that when executed execute the ANN 320-3. The compiled instructions can, when executed, assign the execution of the ANN 320-2 to a cluster of processing resources of a DLA (e.g., the DLA 104 of FIG. 1) of the memory device and the execution of the ANN 320-1 to a different cluster of processing resources of the DLA. The DLA can comprise one or more clusters of processing resources. That is, the processing resources of the DLA can be organized into clusters. Each of the clusters of processing resources can be controlled by control circuitry to function as a unit. For example, one or more of the clusters of processing resources can execute a first ANN while a different one or more of the clusters of processing resources can execute a second ANN. As such, compiling the instructions can further comprise organizing the clusters of the processing resources and the different clusters of processing resources used to execute the ANN 320-1 and 320-2. To organize the clusters of processing resources and assign ANNs for execution on said clusters, the compiler 315 can also receive and utilize a specification of the DLA on which the ANN 320-3 is to be executed. The specification can, for example, identify the processing resources of the compiler 315 and can provide command identifiers for commands used to cluster the processing resources.

The compiler 315 can place the ANN 320-2 between two of the layers of the ANN 320-1. The placement of the ANN 320-2 within the layers of the ANN 320-1 can be selected to meet a resource criterion of the memory device using the representative dataset 331-2. Depending on where in the path of the ANN 320-1 the ANN 320-2 is placed, different amounts of resources will be used by execution of the resulting ANN with the created bypass. In at least one embodiment, the ANN 320-2 can be placed at a latest point in the path of the ANN 320-1 that allows execution of the ANN 320-1 with the bypass created by placement of the ANN 320-2 while satisfying the resource criterion (e.g., where a later placement would not allow the resource criterion to be satisfied).

Although not shown in FIG. 3, the compiler 315 can merge multiple ANNs, including the ANN 320-2, with a particular ANN such as the ANN 320-1. An execution of a portion of the ANN (e.g., first ANN) utilizes more resources than an execution of any one of the multiple ANNs including the ANN 320-2. For example, a second ANN can be used to bypass a first portion of the layers of the first ANN while a third ANN can be used to bypass a second portion of the layers of the first ANN.

An execution of the third ANN can utilize less resources than an execution of the second portion of the first ANN. The execution of the second ANN can utilize less resources than an execution of the first portion and/or a second portion of the first ANN.

The second ANN and the first portion of the first ANN can be executed concurrently. The third ANN and the second portion of the first ANN can also be executed concurrently. Executing layers of ANNs concurrently includes execution, at least partially, of the layers at a same time. In various examples, the second ANN and the third ANN can be executed concurrently. Layers can be executed concurrently given that the more than one cluster of processing resources of the DLA can process at a same time. For instance, the second ANN can be executed using a first cluster of processing resources of the DLA while a first portion of the first ANN is executed using a second cluster of processing resources.

In various examples, a host can be implemented over a cloud system that includes one or more memory devices. For example, a network 996 of FIG. 9 can be used to compile instructions for the execution of an ANN. A host can generate compiled instructions and can provide the generated compiled instructions to a memory device via the network 996. The instructions can be particular to the DLAs, where the DLAs are implemented in one or more memory devices. For example, the compiler 315 can also receive specifications corresponding to one or more DLAs implemented in one or more of the memory devices. The compiler 315 can generate compiled instructions particular to the one or more DLAs. The compiled instructions can be executed to execute an ANN such as the ANN 320-3.

The controller 315 can generate a plurality of instructions that can be executed by different DLAs to execute the ANN 320-3. The controller 315 can generate the plurality of instructions at a same time or at different times. For example, the controller 315 can generate instructions particular to a first DLA at a first time. Thereafter, the ANN 320-3 can be migrated to a different DLA. To migrate the ANN 320-3, the compiler 315 can generate new compiled instructions particular to the different DLA. The new compiled instructions can be provided to and executed by the DLA to migrate the ANN 320-3 to the different DLA.

In various instances, the compiler 315 can generate the instructions and the new instructions at a same time. Thereafter, when the ANN 320-3 is migrated from the first DLA to the different DLA, the compiler 315 may not need to generate the new instructions. The new instructions can be stored in the first DLA and/or the different DLA. The compiler 315 can provide the previously generate new instructions to the different DLA as they are needed. The different DLA can implement the new instructions.

Figure 4:
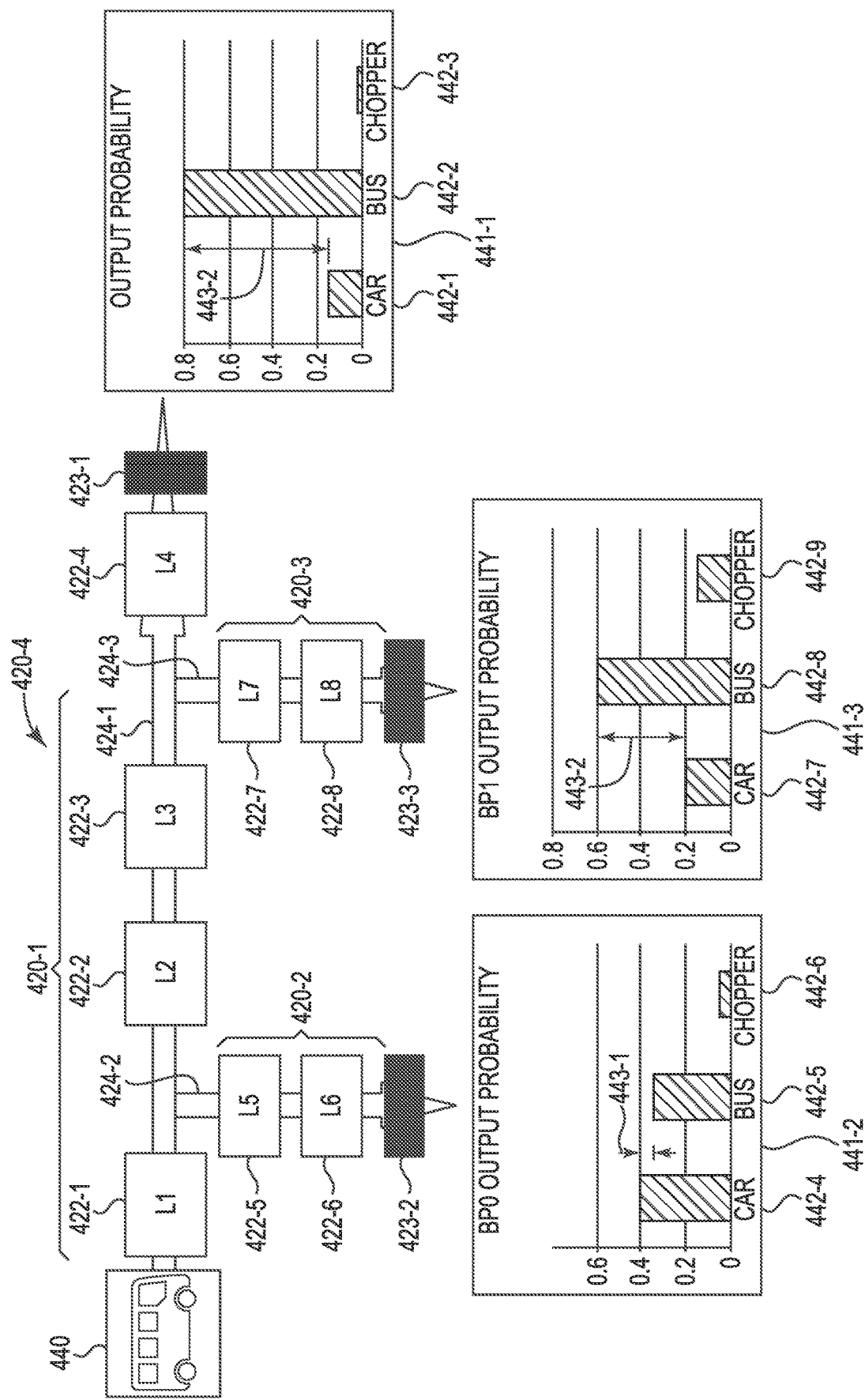
FIG. 4 illustrates an artificial neural network with multiple bypass paths in accordance with a number of embodiments of the present disclosure.

FIG. 4 illustrates an artificial neural network 420-4 with multiple bypass paths 424-2, 424-3 in accordance with a number of embodiments of the present disclosure. The ANN 420-4 can include layers 422-1, 422-2, 422-3, 422-4 which correspond to an ANN 420-1. The ANN 420-4 can also include layers 422-5, 422-6 which correspond to ANN 420-2 and layers 422-7, 422-8 which correspond to ANN 420-3. An input 440 can be provided to the layer 422-1 to provide the input 440 to the ANN 420-4. Outputs can be generated by the output layers 423-1, 423-2, 423-3 to generate outputs for the ANN 420-4.

The layers 422-1, 422-2, 422-3, 422-4 can comprise the path 424-1. The layers 422-5, 422-6 comprise the path 424-2. The layers 422-7, 422-8 comprise the path 424-3. The ANN 420-4 can include an output layer 423-1 corresponding to the path 424-1, an output layer 423-2 corresponding to the path 424-2, and an output layer 423-3 corresponding to the path 424-3.

The output layers 423-1, 423-2, 423-3 can provide output probabilities 442-1, 442-2, 442-3, 442-4, 442-5, 442-6, 442-7, 442-8, 442-9 corresponding one or more categories. For example, the output layer 423-1 can provide the output 441-1 which comprise the output probabilities 442-1, 442-2, 442-3. The output layer 423-2 can provide the output 441-2 which comprise the output probabilities 442-4, 442-5, 442-6. The output layer 423-3 can provide the output 441-3 which comprises the output probability 442-7, 442-8, 442-9. The outputs 441-1, 441-2, 441-3 can be referred to as outputs 441.

The output 441 can include probabilities that correspond to a category. For example, the output 441-1 include the probability 442-1 which corresponds to a first category (e.g., a car category), the probability 442-2 which corresponds to a second category (e.g., a bus category), and the probability 442-3 which corresponds to a third category (e.g., a chopper category). The output 441-2 includes the probability 442-4 which corresponds to the first category, the probability 442-5 which corresponds to the second category, and the probability 442-6 which corresponds to the third category. The output 441-3 include the probability 442-7 which corresponds to the first category, the probability 442-8 which corresponds to the second category, and the probability 442-9 which corresponds to the third category.

Output layers 423-1, 423-2, 423-3 can select a highest probability from the outputs 441-1, 441-2, 441-3 and can provide (e.g., output) the selected highest probability from the output probabilities. For example, the output layer 423-1 can select the probability 442-2, the output layer 423-2 can select the probability 442-4, and the output layer 423-3 can select the probability 442-8. The control circuitry can determine whether the output of the output layers 423-1, 423-2, 423-3 is suitable by determining whether a metric corresponding to the output is greater than a threshold. The metric corresponding to the output can be a margin of confidence. The threshold can also be a margin of confidence. As used herein, the margin of confidence is a numerical value which can be used to determine whether an output of a given output layer should be trusted (e.g., is suitable).

The margin of confidence can be the difference between the greatest probability and the next greatest probability. For instance, the margin of confidence of the output 441-2 can be 0.1 which is calculated as the difference (0.4–0.3) between the probability 442-4 (0.4) and the probability 442-5 (0.3).

In various examples, the control circuitry can receive the margin of confidence and/or can compute the margin of confidence after receiving the greatest probability and the next greatest probability. The margin of confidence threshold can be stored in a register of the control circuitry and/or in the memory array 110 in FIG. 1. For instance, the margin of confidence threshold can be 0.6 but is not limited to 0.6.

If the margin of confidence is greater than the margin of confidence threshold, then the output can be used as the output for the ANN 420-4. For instance, the margin of confidence of the output of the output layer 423-2 can be 0.1 which is smaller than the margin of confidence threshold such that the probability 442-4 and its corresponding category are not selected (e.g., suitable) as the output of the ANN 420-4. The margin of confidence of the output of the output layer 423-3 can be 0.4 (0.6–0.2) which is smaller than the margin of confidence threshold such that the probability 442-8 and its corresponding category are not selected (e.g., suitable) as the output of the ANN 420-4. The margin of confidence of the output of the output layer 423-1 can be 0.65 (0.8–0.15) which is greater than the margin of confidence threshold such that the probability 442-2 and its corresponding category are selected (e.g., suitable) as the output of the ANN 420-4.

The execution stream can be such that the layer 422-1 is executed before the execution of other layers. The output of the layer 422-1 can be provided to the layers 422-2, 422-5. The layer 422-2 and the layer 422-5 can be executed concurrently and/or sequentially. Signals can be propagated from the layer 422-5 to the output layer 423-2. The output of the output layer 423-2 is not selected as an output of the ANN 420-4 given that the margin of confidence does not meet the margin of confidence threshold. Responsive to not selecting the output of the output layer 423-2, the layer 422-2 can be executed or can continue to be executed.

The output of the layer 422-2 can be provided to the layer 422-3. The output of the layer 422-3 is provided to the layer 422-7 and the layer 422-4. Signals can be propagated from the layer 422-7 to the output layer 423-3. The output of the output layer 423-3 is not selected. Accordingly, the layer 422-4 can be executed or can continue to be executed. The output of the layer 422-4 can be provided to the output layer 423-1. The output of the output layer 423-1 can be used as the output of the ANN 420-4 regardless of whether the margin of confidence of the output of the output layer 423-1 meets the margin of confidence threshold.

In the example of FIG. 4, an output for the ANN 420-4 is generated without bypassing any of the layers 422-1, 422-2, 422-3, 422-4. The layers 422-2, 422-3, 422-4 are not bypassed by the bypass paths 424-2, 424-3 given that the margin of confidence of the outputs of the output layers 423-2, 423-3 do not meet a margin of confidence threshold. If the outputs of the output layers 423-2, 423-3 had met the margin of confidence threshold, then the layers 422-2, 422-3, 422-4 would have been bypassed. The layers bypassed are dependent on the placement of the bypass paths.

Figure 5:
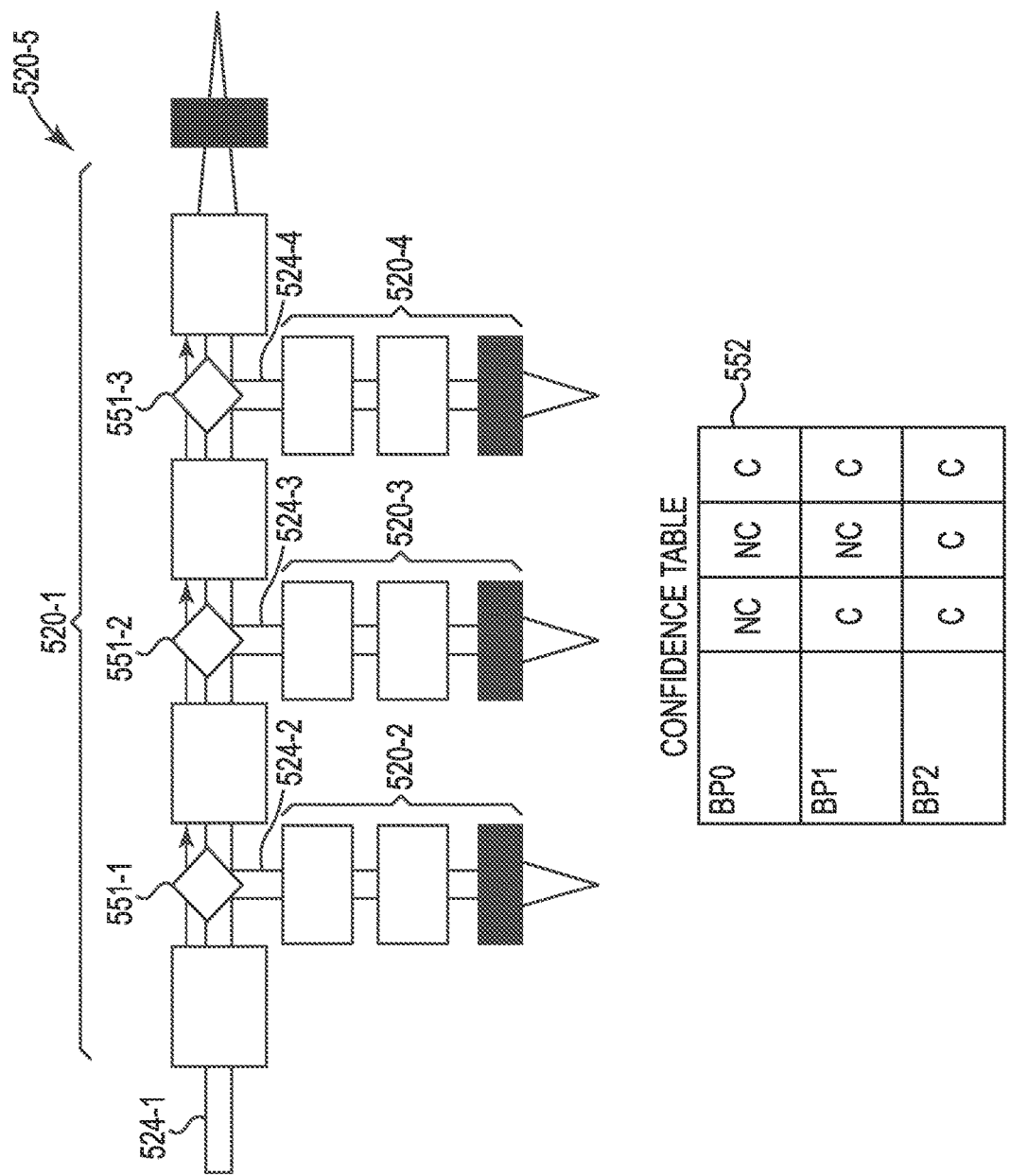
FIG. 5 illustrates an artificial neural network with decision nodes in accordance with a number of embodiments of the present disclosure.

FIG. 5 illustrates an artificial neural network 520-5 with decision nodes 551-1, 551-2, 551-3 in accordance with a number of embodiments of the present disclosure. The ANN 520-5 is comprised of multiple layers. The layers of the ANN 520-5 can be organized into paths 524-1, 524-2, 524-3, 524-4. The path 524-1 is comprised of layers corresponding to an ANN 520-1. The path 524-2 is comprised of layers corresponding to an ANN 520-2. The path 524-3 is comprised of layers corresponding to an ANN 520-3. The path 524-4 is comprised of layers corresponding to an ANN 520-4. Collectively, the layers corresponding to the ANNs 520-1, 520-2, 520-3, 520-4 can be referred to as the ANN 520-5.

The ANN 520-5 can also comprise the decision nodes 551-1, 551-2, 551-3. The decision nodes 551-1, 551-2, 551-3 can also be referred to as nodes 551. The outputs of the nodes 551 can be used to determine whether to execute the layers corresponding to the ANN 520-2, 520-3, 520-4 or the layers corresponding to the ANN 520-1.

For example, the decision node 551-1 can control whether the layers of the path 524-2 are executed or whether layers of the path 524-1 continue to be executed. The decision node 551-2 can control whether the layers of the path 524-3 are executed or whether layers of the path 524-1 continue to be executed. The decision node 551-3 can control whether the layers of the path 524-4 are executed or whether layers of the path 524-1 continue to be executed.

The decision node 551-1 can utilize a confidence table 552 to determine whether to execute the layers corresponding to the paths 524-1, 524-2. The confidence table 552 can be used to determine whether to execute the layers corresponding to the paths 524-2, 524-3, 524-4 or execute the layers corresponding to the path 524-1. The confidence table 552 can provide a representation of the traversing of the paths 524-1, 524-2, 524-3, 524-4. As used herein, the paths 524-1, 524-2, 524-3, 524-4 can be traversed by executing the layers corresponding to the paths 524-1, 524-2, 524-3, 524-4. Executing layers can include processing input signals received at nodes of the layers and generating output signals from the nodes of the layers to different nodes of different layers.

For example, the confidence table 552 can describe that in a first iteration of the ANN 520-5 the path 524-2 (e.g., BP0) resulted in a "not confident" (e.g., NC) designation, the path 524-3 (e.g., BP1) resulted in a "confident" (e.g., C) designation, and the path 524-4 (e.g., BP2) resulted in a "confident" designation.

In various instances, the confidence table 552 can be populated by the nodes 551, by the DLA hosting the ANN 520-5, and/or by the control circuitry controlling an execution of the ANN 520-5. For instance, if the decision node 551-1 outputs a signal which causes the path 524-2 not to be traversed, then the confidence table 552 can be updated to show that the path 524-2 resulted in a "not confident" designation in a second iteration of the ANN 520-5. If the decision node 551-2 outputs a signal which causes the path 524-3 to be traversed but the result of traversing the path 524-3 is an output that does not meet a margin of confidence threshold, then the confidence table 552 can be updated to reflect that the path 524-3 resulted in a "not confident" designation. The "not confident" designation can be used to reflect that a particular path was not taken or that the particular path resulted in an output that did not meet the margin of confidence threshold. As such, the confidence table 552 can be updated at multiple places along the paths 524-1, 524-2, 524-3, 524-4. For instance, the confidence table 552 can be updated at the decision nodes 551-1, 551-2, 551-3. The confidence table 552 can also be updated at the output layers of the paths 524-1, 524-2, 524-3, 524-4, among other possible locations.

In various instances, the nodes 551 can alter entries of the table 552 to update the designation for paths with which the nodes 551 are not associated with. For instance, the node 551-1 can be associated with the path 524-2 (e.g., the ANN 520-2), the node 551-2 can be associated with the path 524-3 (e.g., the ANN 520-3), the node 551-3 can be associated with the path 524-4. If the node 551-3 decides that that the path 524-4 should be taken and the path 524-4 terminates in a "confident" designation, then the node 551-3 can generate an entry in the table 552 to indicate that the path 524-4 resulted in a "confident" designation and can generate and/or edit an entry in the table 552 to indicate that the path 524-3 results in a "confident" designation even if the node 551-3 is not associated with the path 524-3 and if the path 524-3 was previously determined to have a "not confident" result. In subsequent iterations of the ANN 520-5, the path 524-3 can be traversed based on the "confident" designation provided by the node 551-3 and stored by the table 552.

In various examples, populating the confidence table 552 can include making inferences regarding the results of the paths 524-1, 524-2, 524-3, 524-4 even though some of the paths 524-1, 524-2, 524-3, 524-4 may not have been traversed. For instance, the path 524-3 may be marked as "confident" in a first traversal (e.g., iteration) of the ANN 520-5, which can result in a "confident" designation for the path 524-4 even though the path 524-4 may not have been traversed. The path 524-4 can be marked as "confident" given that the path 524-4 is expected to be more accurate than the path 524-3. The accuracy of the paths 524-2, 524-3, 524-4 can progressively improve with the output of the path 524-1 being the most accurate path. A designation of "confident" for a given path can also lead to a designation of "confident" to subsequent paths even if the subsequent paths are not traversed. Subsequent paths can include paths of greater complexity.

In a second iteration of the ANN 520-5, the paths 524-2, 524-3 can be marked as "not confident" while the path 524-4 is marked as confident. In a third iteration, the paths 524-2, 524-3, 524-4 are marked as confident.

The nodes 551 can use the confidence table 552 to determine whether to cause the paths 524-2, 524-3, 524-4 to be traversed. The nodes 551 can access multiple iterations of the confidence table to make a decision. For example, the nodes 551 can utilize 3 to 5 iterations of the ANN 520-5 as annotated in the confidence table 552 to make a decision. The amount of data accessed from the confidence table 552 and described herein is demonstrative and not limiting.

In a first iteration, the nodes 551 can cause their corresponding paths 524-2, 524-3, 524-4 to be traversed to populate the confidence table 552. In a second iteration of the ANN 520-5, the node 551-1 can cause the path 524-2 not to be traversed given that the confidence table 552 reflects that the path 524-2 previously yielded a "not confident" designation. In the second iteration, the node 551-2 can cause the path 524-3 to be taken given that the confidence table 552 reflects that the path 524-3 previously yielded a "confident" designation. The result of the path 524-3 can be a "not confident" designation. Responsive to the "not confident" designation of the path 524-3, the node 551-3 can cause the path 524-4 to be traversed. The path 524-4 can result in a "confident" designation which can be used to update the confidence table 552.

In a third iteration of the ANN 520-5, the node 551-1 can utilize the confidence table 552 to determine to cause the path 524-2 to be traversed. For example, the confidence table 552 can be used to determine that the path 524-2 yielded a "not confident" designation in a first and second iteration of the ANN 520-5, which can be used to support a conclusion not to traverse the path 524-2. However, the node 551-1 can also access the designations for the path 524-3 to make a decision. The node 551-1 can determine that the path 524-3 yielded a "confident" and "not confident" designations in a first and second iteration of the ANN 520-5, which can be used to support a determination to traverse the path 524-3. Given that the path 524-3 is expected to be traversed, the node 551-1 can cause the path 524-2 to be traversed. If a given path is expected to be traversed, then a prior path can also be traversed even if the confidence table 552 can be used to support a decision not to traverse the prior path. The prior path can be traversed to test whether the "not confident" designation should once again be assigned to the prior path or if a "confident" designation is appropriate in a given iteration. The expectation is that prior paths to paths that are expected to result in a "confident" designation should be tested to determine whether the prior paths can be designated as "confident."

In the example of the third iteration, the path 524-2 can receive a designation of "confident." Accordingly, the subsequent paths 524-3, 524-4 can be designated as "confident" even though they are not traversed. In the third iteration, the layers subsequent to the node 551-1 can be bypassed such that the path 520-1 does not generate an output. In the third iteration, the output of the path 524-2 can be used as the output of the ANN 520-5. The example provided by FIG. 5 utilizes two designations (e.g., "confident" and "not confident") but examples are not limited to two designations. The example of FIG. 6 provides the use of three designations.

Figure 6:
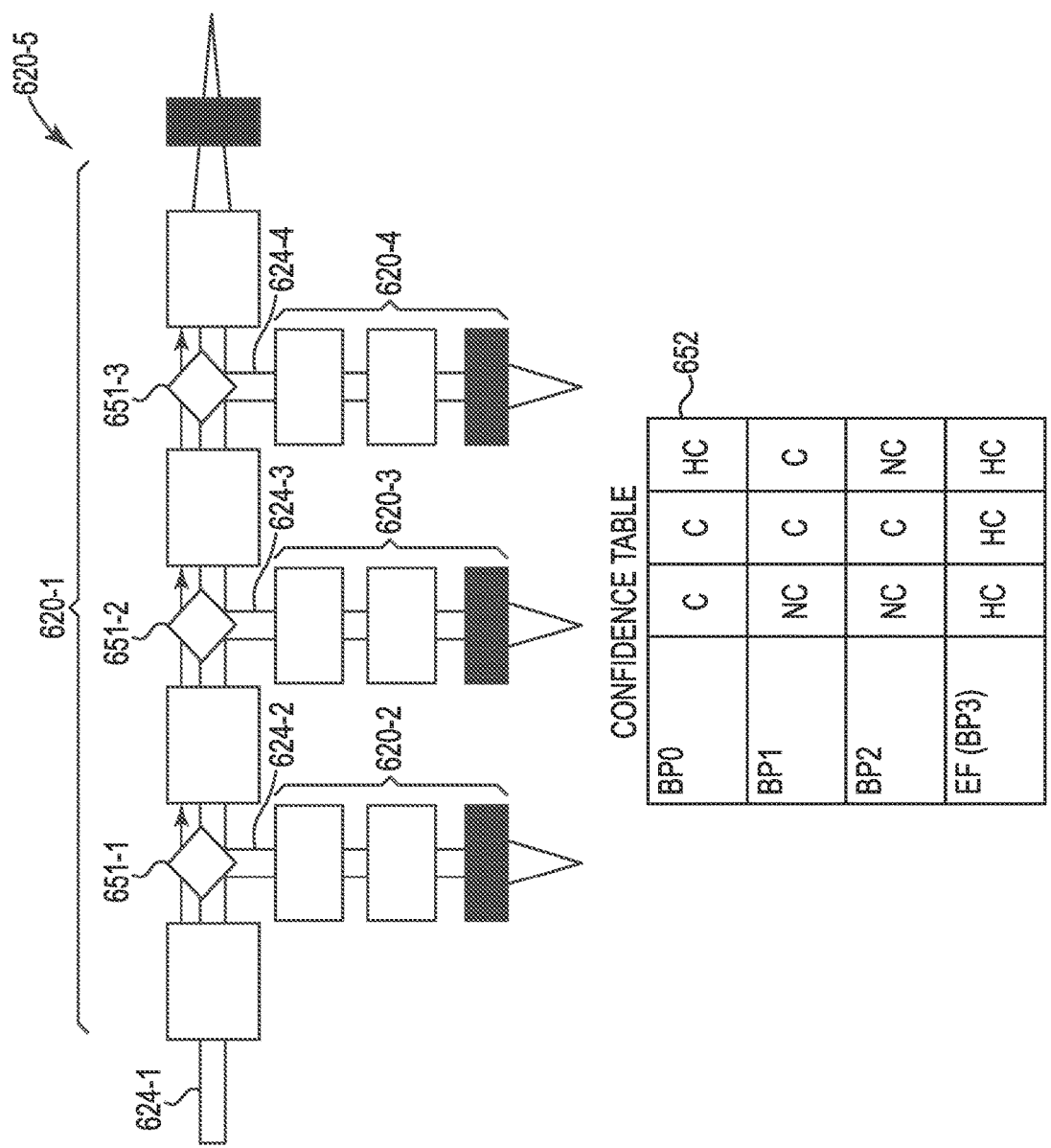
FIG. 6 illustrates an artificial neural network with decision nodes in accordance with a number of embodiments of the present disclosure.

FIG. 6 illustrates an artificial neural network 620-5 with decision nodes 651-1, 651-2, 651-3 in accordance with a number of embodiments of the present disclosure. The ANN 620-5 is comprised of multiple layers. The layers of the ANN 620-5 can be organized into paths 624-1, 624-2, 624-3, 624-4. The path 624-1 is comprised of layers corresponding to an ANN 620-1. The path 624-2 is comprised of layers corresponding to an ANN 620-2. The path 624-3 is comprised of layers corresponding to an ANN 620-3. The path 624-4 is comprised of layers corresponding to an ANN 620-4. Collectively, the layers corresponding to the ANNs 620-1, 620-2, 620-3, 620-4 can be referred to as the ANN 620-5.

The ANN 620-5 can also comprise the decision nodes 651-1, 651-2, 651-3. The decision nodes 651-1, 651-2, 651-3 can also be referred to as nodes 651. The outputs of the nodes 651 can be used to determine whether to execute the layers corresponding to the ANN 620-2, 620-3, 620-4 or the layers corresponding to the ANN 620-1.

The nodes 651 can utilize the confidence table 652. The confidence table 652 can be stored in memory cells of a memory array and/or in registers of a control circuitry. The confidence table 652 can also be stored in registers of the DLA, among other locations. The confidence table 652 can store three or more designations of a confidence in an output of the paths 624-1, 624-2, 624-3, 624-4, 624-5.

The three or more designations can include "not confident," "confident," and "highly confident." For example, in a first iteration of the ANN 620-5 the nodes 651-1, 651-2, 651-3 can cause the paths 624-2, 624-3, 624-4 to be traversed. The designations "not confident," "confident," and "highly confident" can be associated with two or more margin of confidence thresholds. For example, below a first margin of confidence threshold (0.4) an output of a path can be designated as "not confident." An output of a path that has a margin of confidence that is equal to or greater than the first margin of confidence threshold (0.4) but smaller than a second margin of confidence threshold (0.8) can be designated as "confident." An output of a path that has a margin of confidence that is equal to or greater than the second margin of confidence threshold (0.8) can be designated as "highly confident."

The confidence table 652 can be populated such that the first iteration of the ANN 620-5 shows the path 624-2 as being "confident," the path 624-3 as being "not confident," the path 624-4 as being "not confident," and the path 624-1 (EF(BP3)) as being "highly confident." In subsequent iterations, each of the nodes 651-1, 651-2, 651-3 can review the confidence table 625 to determine whether to traverse the paths 624-1, 624-2, 624-3, 624-4. For example, the node 651-1 can access a history of the path 624-2 annotated in the confidence table 652. The history can be used as votes. The votes can be used to determine whether to traverse a given path. If the votes indicate a designation of "confident" or "highly confident", then the nodes can cause a corresponding path to be traversed. If the votes indicate a designation of "not confident" then the nodes can cause a corresponding path not to be traversed.

In a second iteration, the confidence table can be updated to indicate that results of the path 624-2 is "confident," the result of the path 624-3 is "confident," the result of the path 624-4 is "confident," and the result of the path 624-1 is "highly confident." In a third iteration, the confidence table can be updated to indicate that results of the path 624-2 is "highly confident", the result of the path 624-3 is "confident", the result of the path 624-4 is "highly confident", and the result of the path 624-1 is "highly confident." For a given iteration, if a node designates a path as "highly confident" responsive to accessing the history in the confidence table 652, then the confidence table 652 can be updated to reflect that the previously path is "confident".

The nodes 651-1, 651-2, 651-3 can cause a path to be traversed if a vote generated utilizing the confidence table 652 indicates "confident" or "highly confident." The path is not traversed if the vote utilizing the confidence table 652 indicates "not confident."

Figure 7:
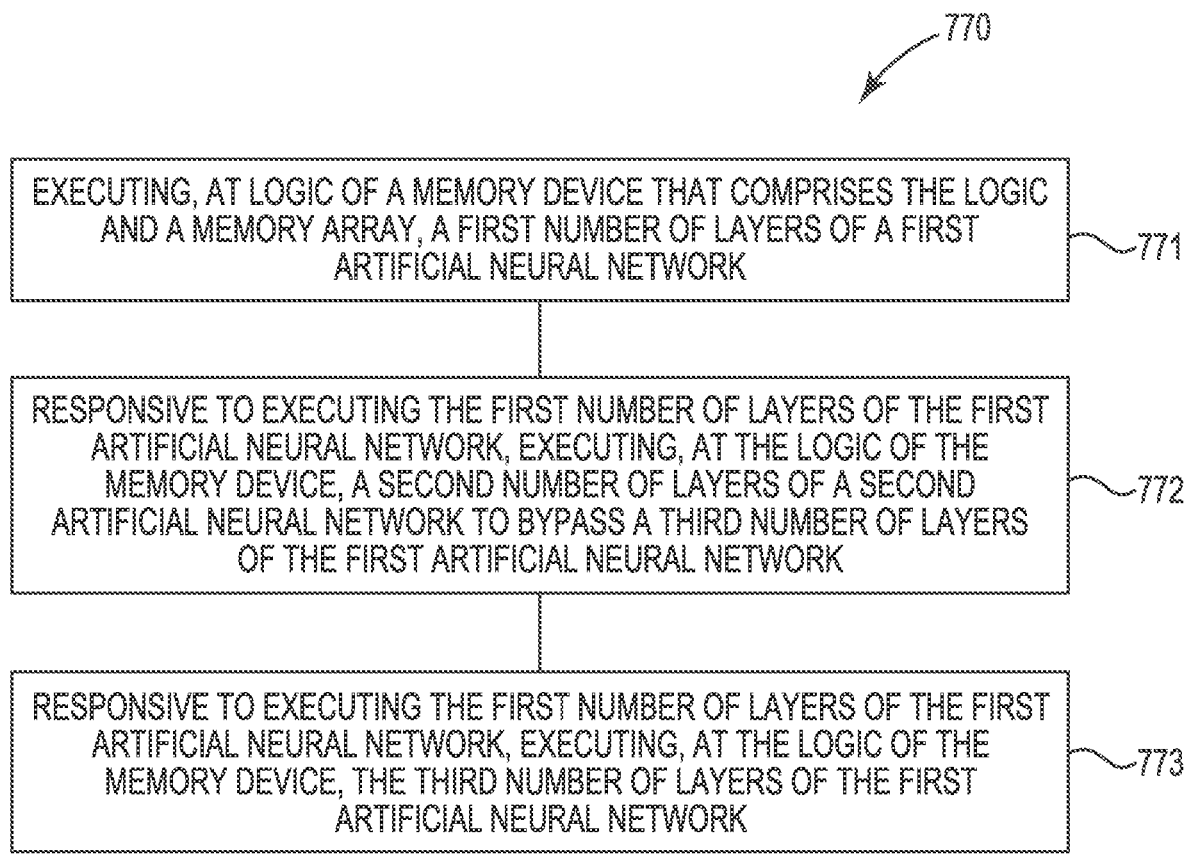
FIG. 7 illustrates an example flow diagram of a method for implementing bypass paths in an artificial neural network implemented in memory in accordance with a number of embodiments of the present disclosure.

FIG. 7 illustrates an example flow diagram of a method 770 for implementing bypass paths in an artificial neural network implemented in memory in accordance with a number of embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 771, a first number of layers of a first artificial neural network can be executed at logic of a memory device comprising the logic and a memory array. At block 772, responsive to executing the first number of layers of the first artificial neural network, a second number of layers of a second artificial neural network can be executed at the logic of the memory device to bypass a third number of layers of the first artificial neural network. At block 773, responsive to executing the first number of layers of the first artificial neural network, the third number of layers of the first artificial neural network can be executed at the logic of the memory device.

An output of the second number of layers can be stored in the memory device based on a confidence (e.g., margin of confidence) of the output of the second number of layers. The output of the second number of layers can be stored as the output of the first artificial neural network based on a confidence of the output of the second number of layers.

The execution of the third number of layers can be stopped responsive to the output of the second number of layers having a confidence value (e.g., margin of confidence) that is greater than a confidence threshold (e.g., margin of confidence threshold). Stopping the execution of the third number of layers can include refraining from propagating signals through the third number of layers.

An output of the third number of layers can be provided as an output of the first ANN. For example, the output of the third number of layers can be stored. The output of the third number of layers can be provided as an output of the first ANN responsive to determining that the output of the second number of layers has a confidence value that is less than a confidence threshold.

In various instances, the second number of layers can be executed concurrently with the execution of the third number of layers of the first ANN. Alternatively, the second number of layers of the second ANN can be executed before the execution of the third number of layers of the first ANN. The execution of the second number of layers can utilize less resources than the execution of the third number of layers which promotes the ability to bypass the third number of layers.

In various examples, a first number of layers of a first ANN retrieved from a memory array can be executed at a DLA of a memory device. Responsive to executing the first number of layers of the first ANN, a determination can be made as to whether to execute a second number of layers of a second ANN retrieved from the memory array based on a historical margin of confidence of the output of the second number of layers. The historical margin of confidence can be used to generate a designation of "confident" or "not confident".

Responsive to determining to execute the second number of layers, the second number of layers of the second artificial neural network can be executed at the DLA. Responsive to executing the first number of layers of the first artificial neural network, a third number of layers of the first artificial neural network retrieved from the memory array can be executed at the DLA.

A margin of confidence included in the historical margin of confidence can be calculated by determining a difference between a first output probability of a first output of the second number of layers and a second output probability of a second output of the second number of layers. The first output and the second output can be generated in a previous iteration of the second number of layers.

A determination can be made as to whether the difference between the first output probability and the second output probability is greater than a threshold. Responsive to determining that the difference is greater than the threshold, a determination can be made as to whether to execute the second number of layers. Responsive to executing the third number of layers and determining not to execute the second number of layers or determining that the margin of confidence of an output of the second number of layers is less than a threshold, it can be determined whether to execute a fourth number of layers of the second ANN based on a historical margin of confidence of an output of the fourth number of layers.

Responsive to determining to execute the fourth number of layers, a fourth number of layers of the second artificial neural network can be executed. Responsive to executing the third number of layers of the first artificial neural network, a fifth number of layers of the first artificial neural network can be executed.

In various examples, responsive to determining that an output of the fourth number of layers has a margin of confidence that is greater than a different threshold, an execution of the fifth number of layers can be halted and an output of the fourth number of layers can be stored as an output of the first ANN. Responsive to determining that the output of the fourth number of layers has the margin of confidence that is less than the different threshold, an output of the fifth number of layers can be stored as an output of the first artificial neural network.

In various instances, a first number of layers of a first artificial neural network retrieved from the memory array can be executed at DLA. Responsive to executing the first number of layers of the first ANN, a determination can be made as to whether to execute a second number of layers of a second ANN retrieved from the memory array. The determination can be made based on a level of confidence that the second number of layers will provide an output having a margin of confidence that is greater than a threshold. As used herein, a level of confidence can reflect a margin of confidence. Responsive to determining to execute the second number of layers, the second number of layers of the second ANN can be executed. Responsive to executing the first number of layers of the first ANN, a third number of layers of the first ANN retrieved from the memory array can be executed at the DLA.

A first level of confidence can be used to determine to refrain from executing the second number of layers. A second level of confidence is used to determine to execute the second number of layers. A third level of confidence is used to determine to execute the second number of layers and update a confidence table for a fourth number of layers of the second artificial neural network to reflect the second level of confidence.

Figure 8:
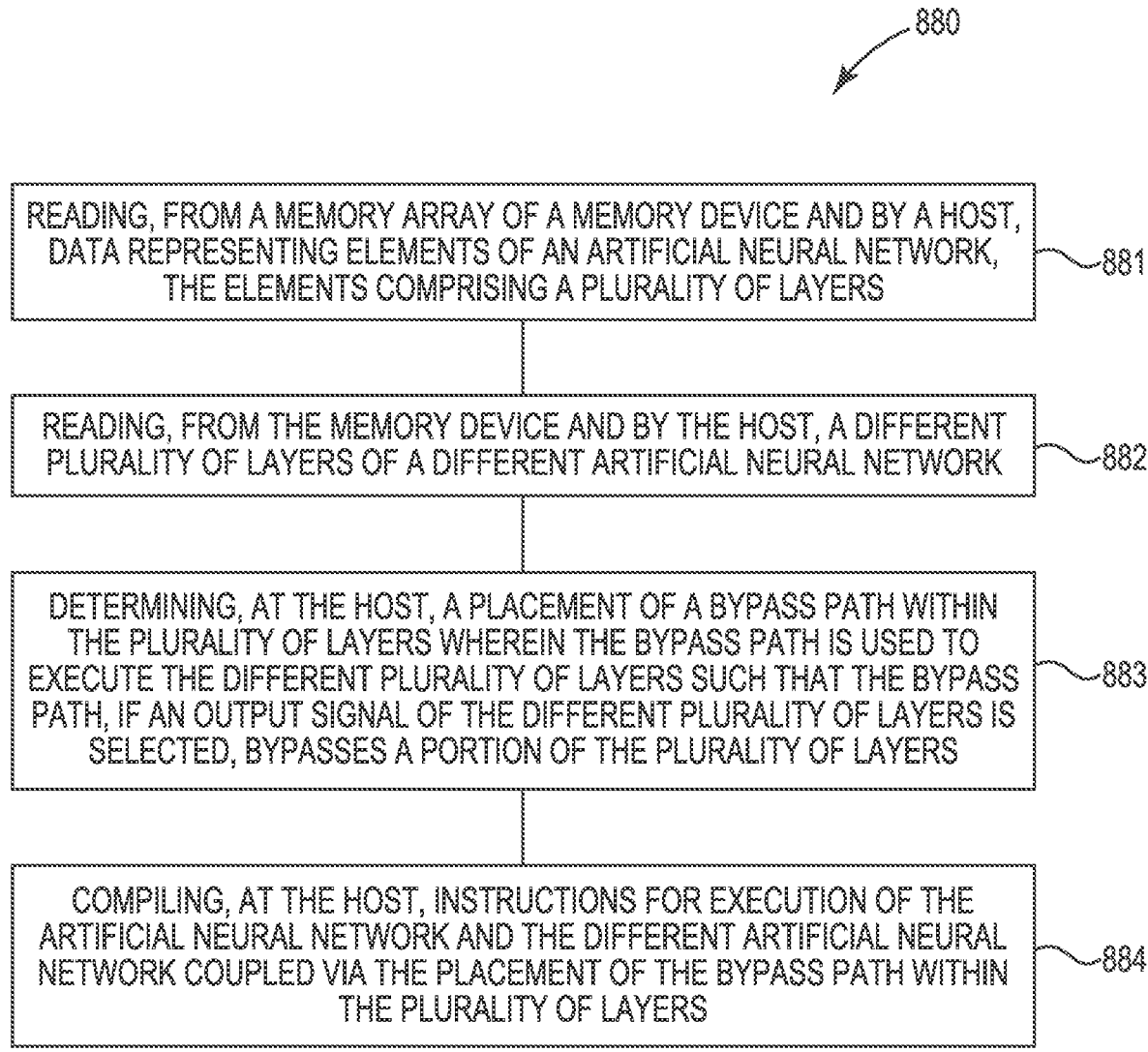
FIG. 8 illustrates an example flow diagram of a method for compiling instructions to implementing bypass paths in an artificial neural network in accordance with a number of embodiments of the present disclosure.

FIG. 8 illustrates an example flow diagram of a method 880 for compiling instructions to implement bypass paths in an artificial neural network in accordance with a number of embodiments of the present disclosure. The method 880 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 880 is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 881, data representing elements of an ANN comprising a plurality of layers can be read from a memory device and by a host. At block 882, a different plurality of layers of a different ANN can be read from the memory device and by a host. At block 883, a determination can be made, at a host, as to a placement of a bypass path within the plurality of layers. The bypass path can be used to execute the different plurality of layers such that the bypass path, if an output signal of the different plurality of layers is selected, bypasses a portion of the plurality of layers. At block 884, instructions for execution of the ANN and the different ANN coupled via the placement of the bypass path within the plurality of layers can be compiled at a host.

The execution of the portion of the plurality of layers can utilize more resources of the memory device than an execution of the different plurality of layers. The execution of the different artificial neural network including the different plurality of layers can utilize less resources of the memory device than a resource threshold defining a resource criterion of the memory device. The resource threshold can comprise an energy consumption of the memory device, a latency of the execution of the different ANN and the ANN, and a bandwidth of the memory device during execution of the different ANN and the ANN.

The execution of the ANN can be assigned to a cluster of processing resources of a DLA of the memory device. The execution of the different ANN can be assigned to a different cluster of processing resources of the DLA. Compiling the instructions can further comprise organizing the cluster of the processing resources and the different cluster of processing resources. Assigning the execution of the ANN and the different ANN utilizing the cluster and the different cluster, respectively, comprises assigning concurrent execution of the portion of the ANN and the different ANN.

Determining the placement of the bypass path within the plurality of layers can further comprise placing the bypass path between two of the plurality of layers of the ANN. As used herein, placing the bypass path can include creating a path where one did not previously exist. The two layers can be selected to meet a resource criterion of the memory device.

In various instances, data representing a first ANN comprising a first plurality of layers can be read. Different data representing a second plurality of layers of a second ANN and a third plurality of layers of a third ANN can be read.

A placement of a first bypass path and a second bypass path can be determined. The first bypass path and the second bypass path can be placed within the first plurality of layers wherein the first bypass path is used to execute the second plurality of layers and the second bypass path is used to execute the third plurality of layers such that the first bypass path, if an output signal of the second plurality of layers is selected, bypasses a portion of the first plurality of layers.

Instructions for execution of the first ANN, the second ANN, and the third ANN coupled via the placement of the first bypass path and the second bypass path within the plurality of layers can be compiled at a host.

The instructions can be compiled for execution of the second ANN and the third ANN such that an execution of the third ANN utilizes more resources than an execution of the second ANN. The second bypass path can bypass a different portion of the first plurality of layers.

In various examples, a first data representing an ANN comprising a plurality of layers can be read from a memory device and via a network. A second data representing a different plurality of layers of a different ANN can be read from the memory device and via the network. A third data representing specifications of a DLA of the memory device can be read from the memory device and via the network. A determination can be made of a placement of a bypass path within the plurality of layers where the bypass path is used to execute the different plurality of such that the bypass path, if an output signal of the different plurality of layers is selected, bypasses a portion of the plurality of layers. A host can compile instructions for execution of the ANN and the different ANN coupled via the placement of the bypass path within the plurality of layers and in view of the specifications of the DLA.

The third data representing specifications of a plurality of DLAs of a plurality of memory devices can be read. The instructions for execution of the ANN and the different ANN can be compiled in view of the specification of the plurality of DLAs of the plurality of memory devices. A plurality of signals, can be compiled, indicating that the ANN and the different ANN have migrated from the memory device to a different memory device, where the memory device comprises one of the plurality of DLAs and the different memory device comprises a different one of the plurality of the DLAs.

The compiled instructions for execution of the ANN and the different ANN can be provided to the different memory device in view of the different DLA responsive to receipt of the plurality of signals.

Figure 9:
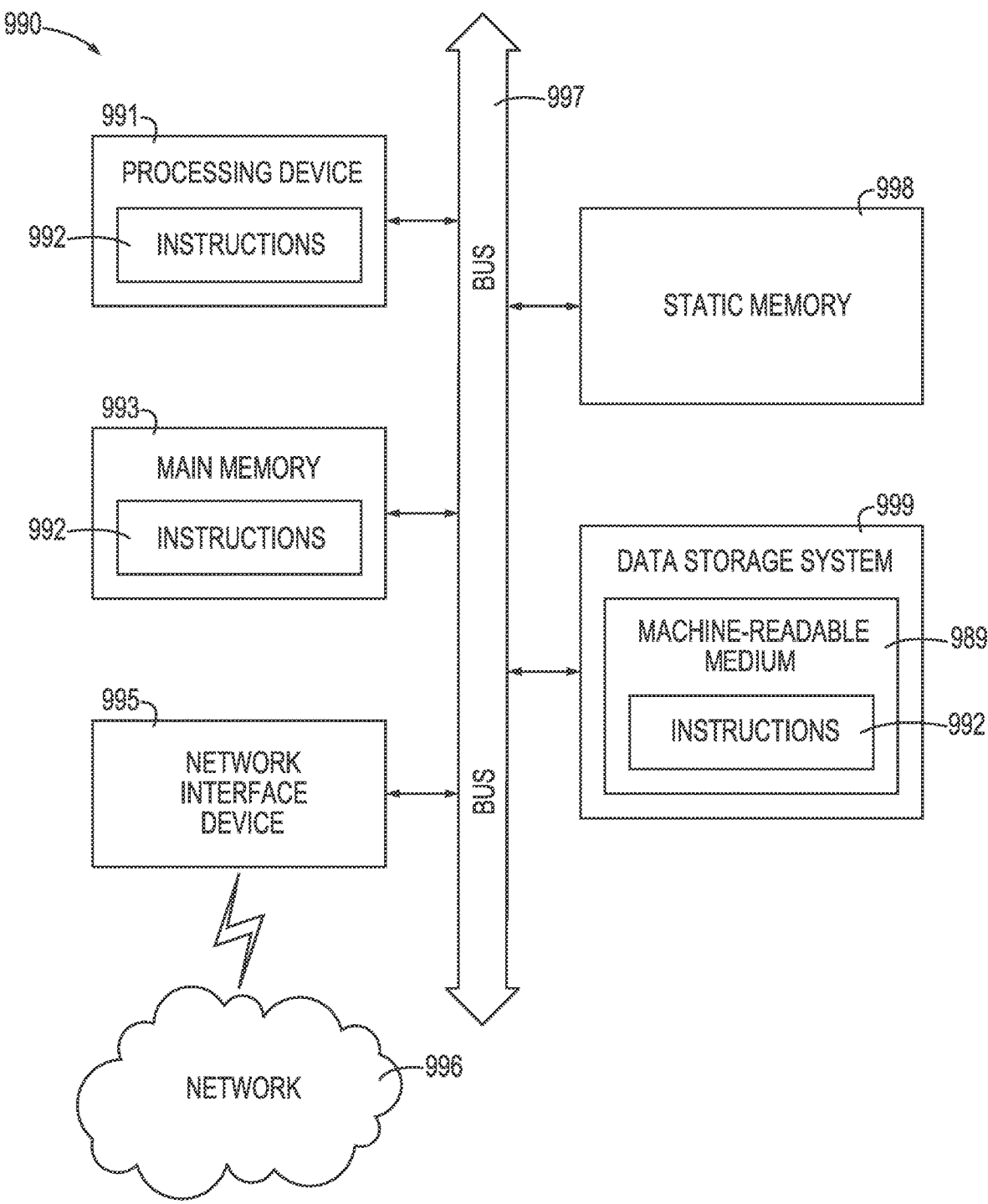
FIG. 9 illustrates an example machine of a computer system within which a set of instructions, for causing the machine to perform various methodologies discussed herein, can be executed.

FIG. 9 illustrates an example machine of a computer system 990 within which a set of instructions, for causing the machine to perform various methodologies discussed herein, can be executed. In various embodiments, the computer system 990 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 990 includes a processing device 991, a main memory 993 (e.g., read-only memory (ROM), flash memory, dynamic random access memory (DRAM) such as synchronous DRAM (SDRAM) or Rambus DRAM (RDRAM), etc.), a static memory 997 (e.g., flash memory, static random access memory (SRAM), etc.), and a data storage system 999, which communicate with each other via a bus 997.

Processing device 991 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 991 can also be one or more special-purpose processing devices such as an application specific integrated circuit (ASIC), a field programmable gate array (FPGA), a digital signal processor (DSP), network processor, or the like. The processing device 991 is configured to execute instructions 992 for performing the operations and steps discussed herein. The computer system 990 can further include a network interface device 995 to communicate over the network 996.

The data storage system 999 can include a machine-readable storage medium 989 (also known as a computer-readable medium) on which is stored one or more sets of instructions 992 or software embodying any one or more of the methodologies or functions described herein. The instructions 992 can also reside, completely or at least partially, within the main memory 993 and/or within the processing device 991 during execution thereof by the computer system 990, the main memory 993 and the processing device 991 also constituting machine-readable storage media.

In one embodiment, the instructions 992 include instructions to implement functionality corresponding to the host 102 and/or the memory device 103 of FIG. 1. While the machine-readable storage medium 989 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable to:

execute, at logic of a memory device in a first iteration, a second number of layers of a first artificial neural network to generate a first output probability of a first output and a second output probability of a second output;

execute, at the logic of the memory device that comprises the logic and a memory array, a first number of layers of the first artificial neural network;

determine whether a difference between the first output probability and the second output probability is greater than a threshold;

responsive to executing the first number of layers of the first artificial neural network, responsive to determining that the difference is greater than the threshold, and responsive to determining that the difference is less than a different threshold, execute, at the logic of the memory device in a second iteration, a second number of layers of a second artificial neural network to bypass a third number of layers of the first artificial neural network;

responsive to executing the first number of layers of the first artificial neural network and responsive to determining that the difference is less than the threshold, execute at the logic of the memory device, the third number of layers of the first artificial neural network; and responsive to executing the first number of layers of the first artificial neural network and responsive to determining that the difference is greater than the different threshold, execute at the logic of the memory device in the second iteration, the second number of layers of the second artificial neural network to bypass the third number of layers of the first artificial neural network and update a confidence table for a fourth number of layers of the second artificial neural network.

2. The medium of claim 1, further comprising storing in the memory device an output of the second number of layers based on a confidence of the output.

3. The medium of claim 2, further comprising storing as an output of the first artificial neural network the output of the second number of layers based on a confidence of the output of the second number of layers.

4. The medium of claim 2, further comprising stopping the execution of the third number of layers responsive to the output of the second number of layers having a confidence value that is greater than a confidence threshold.

5. The medium of claim 2, further comprising storing an output of the third number of layers responsive to determining that the output of the second number of layers has a confidence value that is less than a confidence threshold.

6. The medium of claim 1, wherein executing the second number of layers of the second artificial neural network further comprises executing the second number of layers concurrently with the execution of the third number of layers of the first artificial neural network.

7. The medium of claim 1, wherein executing the second number of layers of the second artificial neural network further comprises executing the second number of layers before the execution of the third number of layers of the first artificial neural network.

8. The medium of claim 1, wherein execution of the second number of layers utilizes less resources than the execution of the third number of layers.

9. The medium of claim 1, wherein the first number of layers, the second number of layers, and the third number of layers are executed in a deep learning accelerator (DLA) of the memory device.

10. An apparatus, comprising:
a deep learning accelerator (DLA);

a memory array; and a controller coupled to the DLA and the memory array and configured to:

execute, at the DLA, a first number of layers of a first artificial neural network retrieved from the memory array;

responsive to executing the first number of layers of the first artificial neural network, determine whether to execute a second number of layers of a second artificial neural network retrieved from the memory array based on a historical margin of confidence of the output of the second number of layers prior to executing the second number of layers;

responsive to determining to execute the second number of layers, execute, at the DLA, the second number of layers of the second artificial neural network;

responsive to executing the second number of layers of the second artificial neural network, update a confidence table for a fourth number of layers of the second artificial neural network to reflect a confidence of an output of the second number of layers of the second artificial neural network; and responsive to executing the first number of layers of the first artificial neural network, execute, at the DLA, a third number of layers of the first artificial neural network retrieved from the memory array.

11. The apparatus of claim 10, wherein the controller is further configured to:

calculate a margin of confidence included in the historical margin of confidence by determining a difference between a first output probability of a first output of the second number of layers and a second output probability of a second output of the second number of layers, wherein the first output and the second output are generated in a previous iteration of the second number of layers.

12. The apparatus of claim 11, wherein the controller is further configured to:

determine whether the difference between the first output probability and the second output probability is greater than a first threshold; and responsive to determining that the difference is greater than the first threshold, determine to execute the second number of layers.

13. The apparatus of claim 12, wherein the controller is further configured to:

responsive to executing the third number of layers and responsive to determining not to execute the second number of layers or determining that the margin of confidence of the output of the second number of layers is less than a second threshold, determine whether to execute the fourth number of layers of the second artificial neural network based on a historical margin of confidence of an output of the fourth number of layers.

14. The apparatus of claim 13, wherein the controller is further configured to:

responsive to determining to execute the fourth number of layers, execute the fourth number of layers of the second artificial neural network; and responsive to executing the third number of layers of the first artificial neural network, execute a fifth number of layers of the first artificial neural network.

15. The apparatus of claim 14, wherein the controller is further configured to:

responsive to determining that an output of the fourth number of layers has a margin of confidence that is greater than the second threshold:
halt an execution of the fifth number of layers; and
store an output of the fourth number of layers as an output of the first artificial neural network; and responsive to determining that the output of the fourth number of layers has the margin of confidence that is less than the second threshold, store an output of the fifth number of layers as an output of the first artificial neural network.

16. A non-transitory machine-readable medium storing instructions executable to:

execute, at a deep learning accelerator (DLA), a first number of layers of a first artificial neural network retrieved from the memory array;

responsive to executing the first number of layers of the first artificial neural network, determine whether to execute a second number of layers of a second artificial neural network retrieved from the memory array based on a historical margin of confidence of an output of the second number of layers prior to executing the second number of layers, wherein the second number of layers includes an output layer;

responsive to determining to execute the second number of layers, execute, at the DLA, the second number of layers of the second artificial neural network; and responsive to executing the first number of layers of the first artificial neural network, execute, at the DLA, a third number of layers of the first artificial neural network retrieved from the memory array; and wherein a first level of confidence of the output of the second number of layers is used to determine to refrain from executing the second number of layers, wherein a second level of confidence of the output of the second number of layers is used to determine to execute the second number of layers, and wherein a third level of confidence of the output of the second number of layers is used to determine to execute the second number of layers and update a confidence table for a fourth number of layers of the second artificial neural network to reflect the second level of confidence.

17. The computer-readable medium of claim 16, further including instructions to cause the computer to select a level of confidence based on the confidence table that includes historical level of confidences of prior iterations of the second number of layers.

18. The computer-readable medium of claim 17, further including instructions to select the level of confidence from two levels of confidences wherein:

the first level of confidence is used to determine to refrain from executing the second number of layers, and the second level of confidence is used to determine to execute the second number of layers.

19. The computer-readable medium of claim 17, further including instructions to update the confidence table responsive to determining whether to execute the second number of layers or responsive to generating an output for the second number of layers.

* * * * *